Feb. 14, 1967   S. C. KAISER   3,303,687
PHOTOGRAPHIC SLIDE MOUNT RIVETING PRESS
Filed June 5, 1964   2 Sheets-Sheet 1

INVENTOR.
BY STANLEY C. KAISER
ATTORNEY

Feb. 14, 1967  S. C. KAISER  3,303,687
PHOTOGRAPHIC SLIDE MOUNT RIVETING PRESS
Filed June 5, 1964  2 Sheets-Sheet 2
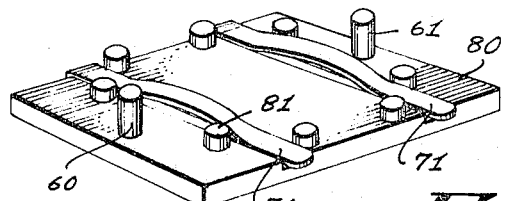
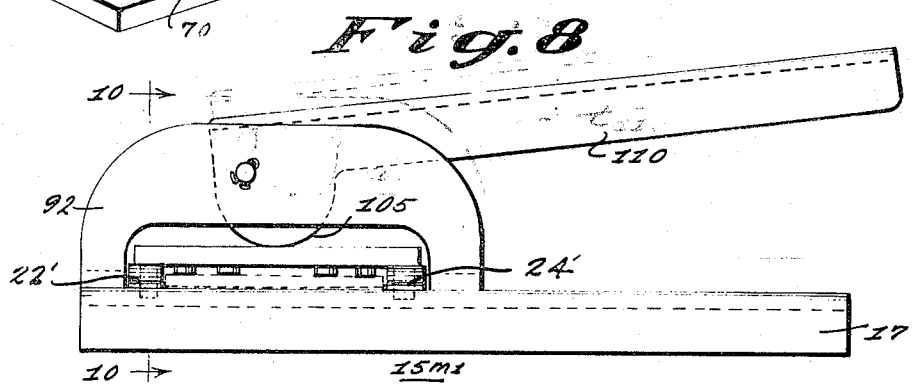
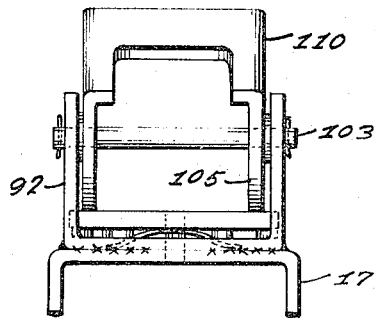 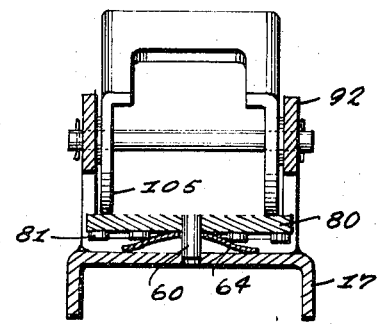
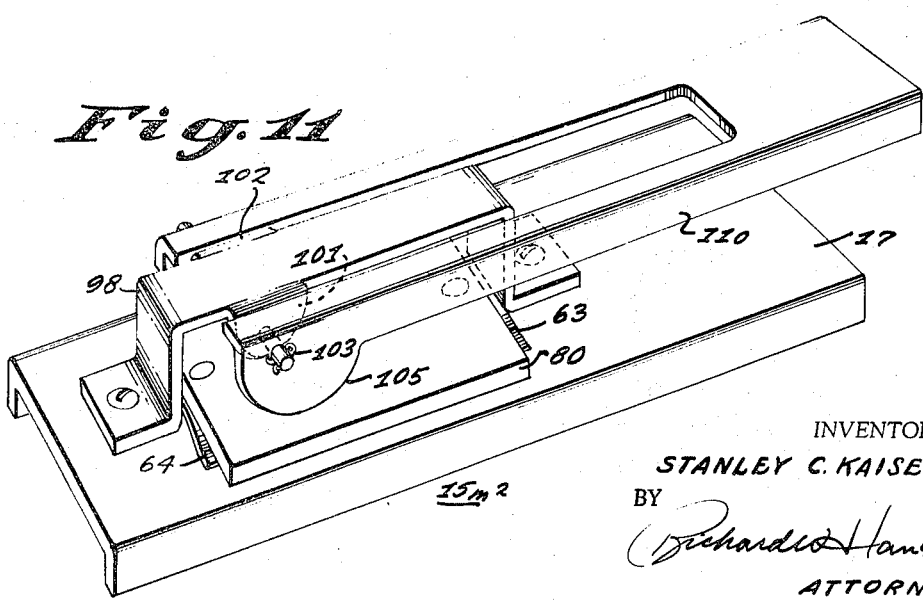
INVENTOR.
STANLEY C. KAISER
BY
ATTORNEY United States Patent Office 3,303,687
Patented Feb. 14, 1967

3,303,687
PHOTOGRAPHIC SLIDE MOUNT
RIVETING PRESS
Stanley C. Kaiser, Quarters 6401–C, Air Force Academy,
Colorado Springs, Colo.
Filed June 5, 1964, Ser. No. 374,231
7 Claims. (Cl. 72—452)

The present invention relates generally to apparatus for the mounting of film transparencies and more specifically to a lever operated press for riveting together a pair of deformable frames which hold the transparency.

Most prior art film mounts consist of a pair of frames, made of paper board or similar material, hinged together along one edge, and adapted to be folded together on the hinged edge with the transparency placed between the two frames so as to be visible through the registered apertures in the two frame members. Later improvements in slide mounts have been made and one type of mount is now constructed from a deformable plastic material and consists of two separate frame members which may be placed together to embrace the film transparency and which are permanently held in that position by riveting, the details of which will become more apparent as the specification proceeds.

It is the primary objective of the present invention to provide a hand operated press which may be advantageously used to rivet the two sections of the slide mount frame together and which riveting press will maintain the frame sections tightly pressed together and against the transparency in order that misalignment will not occur during the riveting process.

It is a second objective of the invention to provide a press and film transparency mounting device whose basic function and design will lend itself to either automatic or manual operation.

Other and further objects, features and advantages of the invention will become apparent as the specification proceeds.

Briefly, the press of the present invention includes a base plate having lateral guides thereon for forming a receptacle or channel for a slide mount frame, a riveting member parallel with the base plate and superimposed over the said receptacle, and lever means operably interconnecting the base plate and riveting member and adapted to move the parallel riveting member up and down with respect to the base plate along an axis normal to the base plate.

In describing the details of the preferred and modified embodiments of the press of the present invention reference will be made to the attached drawings wherein like parts will be referred to by similar reference numbers and the various figures shall be identified as follows:

FIGURE 7 is a perspective view of an alternate modification of the riveting member.

FIGURE 8 is a side elevational view of a modified form of riveting press.

FIGURE 9 is a rear elevational view of the press shown in FIGURE 8.

FIGURE 10 is a cross sectional view of the press of FIGURE 8 taken along lines 10—10 in FIGURE 8.

FIGURE 11 is a perspective view of a third form of riveting press of present invention.

Figure 5:
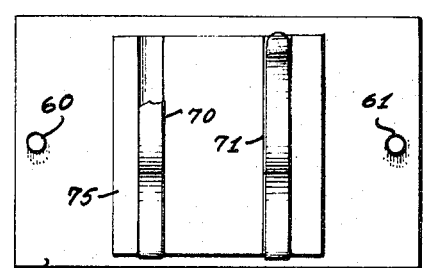
FIGURE 5 is a bottom plan view of an alternate embodiment of the riveting member.
Figures 3, 6:
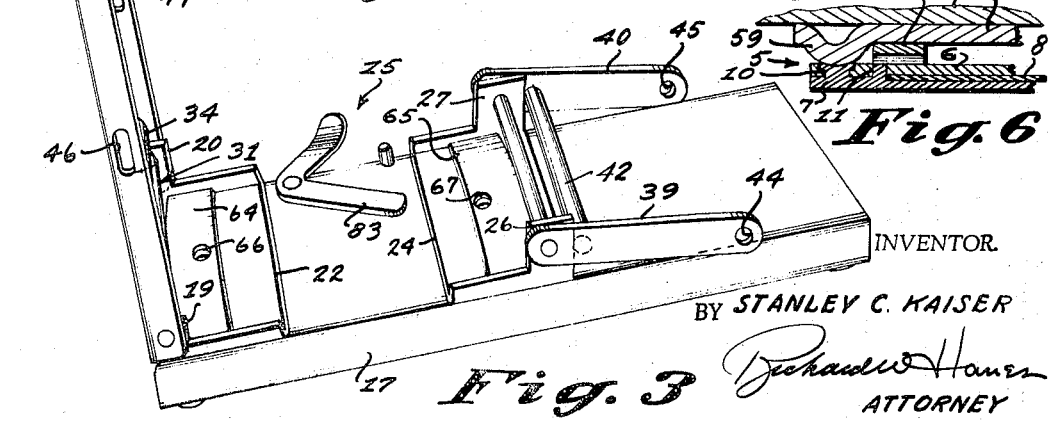
FIGURE 3 is a perspective view of the press showing the lever arms disconnected and the riveting member withdrawn to more clearly illustrate the receptacle or channel formed on the base plate for receiving the slide.
FIGURE 6 is an enlarged fragmentary cross section showing a portion of the riveting member and photographic slide mount at the completion of the riveting process.

Referring now to FIGURES 5 and 6 for an explanation of the photographic slide mount 5, it is seen that the mount is formed of two mating frames 6 and 7 between which is held the film transparency 8. The bottom frame 7 is equipped with integrally formed rivets 10 and locating pins 11 which fit into appropriate apertures 12 and 13 respectively in the top half 6 of the frame 5. The apertures 12 which accept the larger rivet pins 10 are countersunk on the top surface of the frame half 6 in order to make room for the deformed head of the rivet 10 so that bumps or irregular masses of the deformed rivet will not detract from the flat surface of the film mount. In order to properly rivet the mounting frame together equal pressure must be simultaneously applied to all of the rivets 10 so as to deform the rivet into the countersunk aperture, as clearly appears in the cross sectional views of FIGURE 6.

Figure 1:
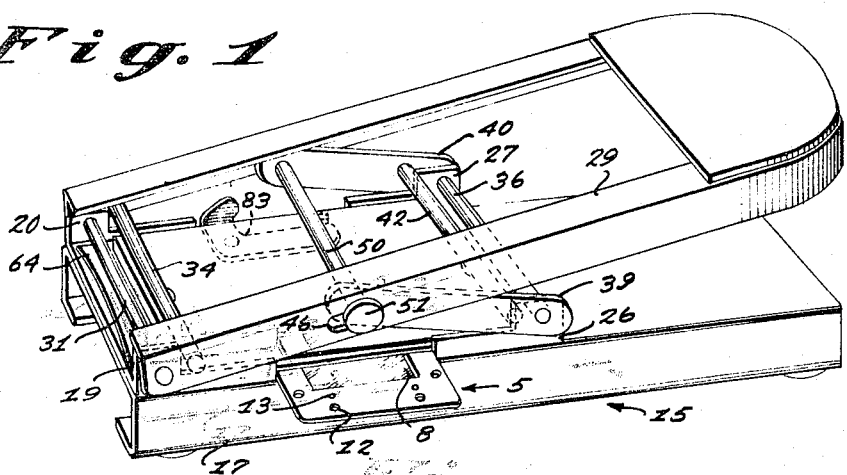
FIGURE 1 is a perspective view of the preferred embodiment of the present invention.
Figure 2:
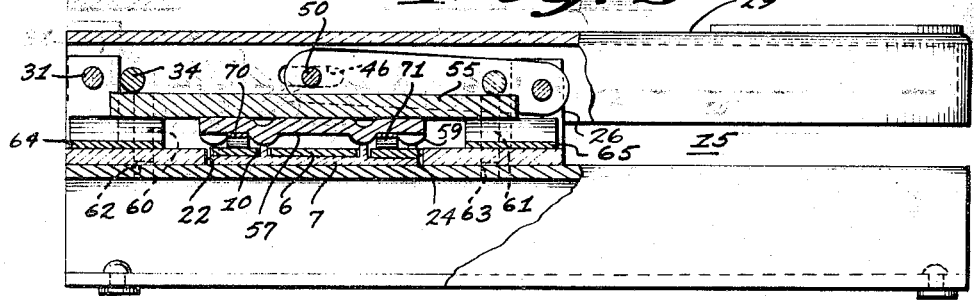
FIGURE 2 is a side elevational view of the preferred riveting press with a portion thereof broken away and shown in cross section in order to more clearly reveal the details of the construction.

The preferred form of press to accomplish the riveting operation is seen in FIGURES 1, 2 and 3 and is generally referred to by reference numeral 15. A sturdy and rigid base plate 17 is constructed from sheet metal or other suitable material and on one end thereof is attached a pair of upstanding and spaced apart bearing ears 19 and 20. As a matter of economy and construction convenience the bearing ears 19 and 20 are formed from a single piece of metal, one edge 22 of which is disposed laterally of the base plate upon the top surface of the latter and forms one side of the guide or channel into which the slide mount 5 is inserted for the riveting operation. Spaced from the edge 22, and parallel therewith, is a second guide 24, also attached to the base plate 17 and also integrally formed with a pair of spaced apart upstanding ears 26 and 27 similar to the first mentioned pair 19 and 20.

A double sided yoke shaped lever arm 29 is pivotally mounted on the first mentioned pair of ears 19 and 20 by means of a spindle 31. Outwardly from the pivotal axis 31 and along the arm 29 a force applying means, in the form of a cylindrical bar 34, is welded between the two sides of the lever arm 29. The purpose of the bar will be explained subsequently. Pivotally mounted on the second mentioned bearing ears 26 and 27, by a common spindle 36, are two lever arms 39 and 40 welded together by a second force applying-bar 42 which is positioned normally to the lever arms 39 and 40 and intermediate their ends.

The free ends of the second mentioned lever arms 39 and 40 are provided with apertures 44 and 45 which may be brought into alignment with oppositely disposed slots 46 and 47 in the two sides of the first mentioned lever arm 29. A cylindrical pin 50 having a retaining means 51 on each end thereof extends through the slots 46 and 47 and the apertures 44 and 45 to form a pin and slot connection between the lever arms 29 and 30 and 40.

Figure 4:
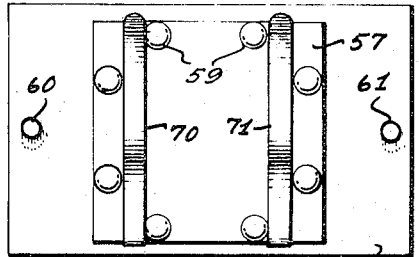
FIGURE 4 is a bottom plan view of the preferred form of a riveting member.

The riveting member may take a variety of forms, some of which are disclosed herein, but the preferred construction is shown in FIGURES 4, 5 and 7. A flat rigid mounting plate 55 is attached to a second plate 57 which is provided with a plurality of dimples 59 placed and interrelated so as to correspond to the rivet locations on the slide mount frames. Mounting pins 60 and 61 project downwardly from the lateral edges of the mounting plate 55 and are designed to be slidably retained in a pair of apertures 62 and 63 on the longitudinal center line of the base plate 17.

In order to keep the riveting member in a raised position when not in operation a pair of leaf springs 64 and 65 are sandwiched between the mounting plate and the base plate so as to urge the mounting plate upwardly. For convenience in maintaining the springs in place the pins 60 and 61 are made to pass through openings 66 and 67 in the leaf springs which openings are directly above the apertures 62 and 63 in the base plate 17.

Two other leaf springs 70 and 71 are fastened to the dimpled pressure plate 57 for the purpose of applying a fixed pressure to the slide mount when it is inserted into the channel or receptacle formed by the guide members 22 and 24. Such pressure tends to keep the two halves of the mount tightly pressed together so that the film will not tend to move out of the very shallow recess provided in the film mount and become misaligned during the riveting operation. FIGURES 5 and 7 illustrate two other embodiments of the riveting member. In FIGURE 5 the pressure plate 75 is constructed without the dimples and while this version will complete the riveting procedure it will not seat the rivet heads as deeply into the countersunk recesses of the top frame half as will the projecting dimples 59 on the preferred embodiment. In FIGURE 7 a mounting plate 80 directly carries the pressure producing members 81 which are formed of cylindrical stock of slightly greater diameter than the slide mount rivets 10.

Any of the three riveting members just mentioned are suitable for use in the press of the present invention and for purposes of this disclosure may generally be referred to as the riveting member or pressure plate.

In operation of the preferred form just described, the photographic film transparency is laid in the small recess provided therefor in the bottom half 7 of the frame mount 5. The top half 6 of the mount is placed on top of the film with the locating pins 11 and rivets 10 being inserted into the proper apertures. The slide mount is then fully inserted into the formed channel on the base plate 17 of the press 15. By applying pressure to the free end of the lever arm 29 the force applying bars 34 and 42 are made to simultaneously descend and apply equal pressure to the riveting member, thus lowering the pressure plate onto the rivet heads to deform them into the countersunk apertures. When the operation is completed the slide is removed from the channel by a pivotal motion of a flat crank arm 83 attached to the base plate which arm acts to push the slide partly out of the channel and available to be grasped.

Second and third modifications 15M1 and 15M2 of the press of the present invention are illustrated in FIGURES 8 and 11 respectively. Generally speaking the principles of construction and operation are similar to that of the preferred embodiment. The primary distinction lies in the design of the lever arm and the associated force applying means and in the more simplified manner of mounting the lever arm onto the base plate 17.

In the modification 15M1 of FIGURE 8 a U-shaped bracket member 92 is spot welded to the base plate 17 to form the bearing members to carry the lever arm 110, the bottom portion of the bracket being cut out to provide space for the movable pressure plate 80.

FIGURE 11 illustrates a still further means of supporting the lever arm. An inverted U-shaped strap 98 with spaced depending ears 101 and 102 is mounted directly over the slide channel on the base plate 17 and the lever arm is pivotally mounted by a spindle 103 supported by apertures in the depending ears 101 and 102. In both of the latter embodiments a cam forming curvature 105 is made near the pivot point of the lever arm 110 which cam surface 105 bears against the mounting plate or pressure plate 80 of the riveting member to exert a downward force thereon as the lever arm 110 is pressed downwardly at its free end.

Having thus described the several useful and novel features of the photographic slide mount riveting press of the present invention in connection with the accompanying drawings, it will be seen that the many worthwhile objectives for which it was designed have been achieved. Although but a few of the several possible embodiments of the invention have been illustrated and described herein, I realize that certain additional modifications may well occur to those skilled in the art within the broad teaching hereof; hence it is my intention that the scope of protection afforded hereby shall be limited only insofar as said limitations are expressly set forth in the appended claims.

I claim:

1. A press for holding and deforming a photographic slide mount including:
   a base plate having lateral guides thereon for forming a receptacle for a pair of slide mount frames;
   a riveting member disposed parallel to the base plate and superimposed over the said receptable; and
   lever means operably interconnecting the base plate and riveting member and adapted to move the riveting member up and down with respect to the base plate along an axis normal to the plane of the base plate.

2. The combination as set forth in claim 1 and further including:
   spring means attached to the riveting member and adapted to exert a downwardly directed force on a slide mount which may be inserted into the said receptacle.

3. A photographic slide mount riveting press comprising:
   a rigid base plate having a flat upper surface;
   means forming straight-edged, spaced apart guides attached to the base plate;
   a pair of spaced apart bearing members carried by the base plate;
   means forming a second class lever pivotally connected at its fulcrum to the bearing members, said second class lever means including force applying means intermediate the fulcrum and point of force application on the end of said lever;
   a pressure plate positioned between the base plate and the said force applying means and disposed for movement toward and away from said base plate; and
   spring means located between the pressure plate and base plate for biasing the pressure plate away from the base plate and to resist the downward force applied by the said lever and the force applying means.

4. The combination as set forth in claim 3 and further including:
   a second pair of spaced apart bearing members carried by the base plate;
   second means forming a second class lever pivotally connected at its fulcrum to the said second pair of bearing members, said second second class lever means being movably connected at its outermost end to the first mentioned second class lever at a point intermediate the force applying means and the point at the end of the said first mentioned lever of force application; and
   force applying means carried by the said second lever.

5. The combination as set forth in claim 4 wherein the said pressure plate has a plurality of downwardly extending projections adapted to contact the rivets on a photographic slide mount inserted beneath the pressure plate.

6. The combination of claim 5, and further including leaf spring means secured to the pressure plate.

7. A press for holding and deforming a photographic slide mount including:
   a base plate having laterally disposed and spaced apart guide members forming a shallow channel into which photographic slide mount frames may be inserted;
   a bracket having a pair of spaced apart bearing members secured to the base plate and disposed above the said shallow channel;

a lever pivotally mounted at one end thereof on the bearing members, said lever having at least one cam forming surface at the pivoted end thereof;

a pressure plate having guide pins protruding from the bottom surface thereof, said pins being slidably disposed in pin aligned apertures in the base plate outside of the said shallow channel; and spring means surrounding each of said pins and contacting the top surface of the base plate and the underside of the pressure plate in order to bias the pressure plate away from the base plate.

References Cited by the Examiner
UNITED STATES PATENTS

| | | | |
|---|---|---|---|
| 292,521 | 1/1884 | Webster | 29—243.54 |
| 1,677,659 | 7/1928 | Saffold | 72—452 |
| 1,702,569 | 2/1929 | Olson | 227—53 |
| 2,454,326 | 11/1948 | Makenny | 29—200 |
| 2,629,165 | 2/1953 | Stillwagon | 29—148.1 |
| 2,705,346 | 4/1955 | Schlabach | 264—320 |

RICHARD J. HERBST, *Primary Examiner.*

G. P. CROSBY, *Assistant Examiner.*